(12) United States Patent
Maltz et al.

(10) Patent No.: US 8,451,521 B2
(45) Date of Patent: May 28, 2013

(54) FINDING A LOCUS OF COLORANT FORMULATIONS THAT PRODUCES A DESIRED COLOR

(75) Inventors: Martin S. Maltz, Rochester, NY (US); Raja Bala, Pittsford, NY (US); Yonghui Zhao, Penfield, NY (US); Matthew Frederick Hoffmann, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 570 days.

(21) Appl. No.: 12/782,362

(22) Filed: May 18, 2010

(65) Prior Publication Data
US 2011/0286015 A1 Nov. 24, 2011

(51) Int. Cl.
*G03F 3/08* (2006.01)
(52) U.S. Cl.
USPC ............ 358/518; 358/1.9; 358/520; 358/523; 358/525; 382/167
(58) Field of Classification Search
CPC .............................. G06K 15/02; H04N 1/6058
USPC ............................ 358/1.9, 518–523; 382/167
See application file for complete search history.

(56) References Cited

U.S. PATENT DOCUMENTS

| | | | |
|---|---|---|---|
| 5,812,694 A | 9/1998 | Mahy | |
| 6,268,867 B1 * | 7/2001 | Sato et al. | 345/589 |
| 7,528,971 B2 | 5/2009 | Harrington | |
| 7,595,910 B2 * | 9/2009 | Mahy et al. | 358/3.01 |
| 7,692,833 B2 * | 4/2010 | Ito | 358/525 |
| 7,929,188 B2 * | 4/2011 | Kuno | 358/523 |
| 2004/0126009 A1 * | 7/2004 | Takenaka et al. | 382/162 |
| 2005/0280870 A1 * | 12/2005 | Mahy et al. | 358/3.03 |
| 2007/0047035 A1 | 3/2007 | Ito | |

OTHER PUBLICATIONS

Ricardo L De Queiroz. A Color Transformation for the Compression of CMYK Images. IEEE Transactions on Image Processing, Jan. 2007. Xerox Corporation. Webster, New York.

* cited by examiner

*Primary Examiner* — Richard Zhu
(74) *Attorney, Agent, or Firm* — Philip E. Blair; Fleit Gibbons Gutman Bongini & Bianco P.L.

(57) ABSTRACT

What is disclosed is a novel system and method for converting a set of L*a*b* values to CMYK color space in which all CMYK formulations that produce each L*a*b* value are found and enumerated. The CMYK formulations are found through a search algorithm starting with the lightest L*a*b* values then visiting neighboring L*a*b* values until the entire L*a*b* color set has been processed. The CMYK space is tessellated into a set of pentahedrons, and for each L*a*b* value, an enclosing pentahedron is found and the CMYK values corresponding to where the locus of this point penetrates each surface is recorded. Adjacent pentahedrons are then visited and this process continues until the gamut boundary is reached. The result is a piecewise linear representation of the CMYK locus containing all values that will give the target L*a*b* value. The present method provides a flexible and powerful approach for solving color management problems.

25 Claims, 5 Drawing Sheets

FINDING A LOCUS OF COLORANT FORMULATIONS THAT PRODUCES A DESIRED COLOR

TECHNICAL FIELD

The present invention is directed to systems and methods for determining a locus of colorant formulations that produces a desired color on a four colorant marking device.

BACKGROUND

It is often useful to generate a list of all the CMYK formulations that can be used to make a specified color, and then choose a formulation from the list to satisfy other considerations. Existing ways of doing this are quite slow, so, for example, finding all the formulations for all the nodes of a 33×33×33 LAB to CMYK rendering lookup table (LUT) involving 35,937 nodes would take too long. Therefore, previous techniques for generating such LUTs require the user to specify a GCR to limit the number of CMYK formulations that need be considered. Simple heuristics are often used to determine this GCR, and this often leads to sub-optimal results. The availability of a way to quickly generate CMYK formulation lists also enables the optimal solution of several other color management problems. What is needed are methods for efficiently searching for the locus in a manner which does not depend on an analytic expression but rather relies upon the geometry of the CMYK to LAB multi-dimensional LUT usually used to describe the response of the printer (the printer model) so as to quickly generate CMYK formulations.

Accordingly, what is needed are increasingly sophisticated systems and methods for determining a locus of colorant formulations that produce a desired color on a four colorant marking device which can help effectuate an optimal solution for color management problems.

INCORPORATED REFERENCES

The following U.S. Patent Applications, U.S. patents, and Publications are incorporated herein in their entirety by reference.

"Method For Color Halftoning When Utilizing Redundant Color Inks", U.S. Pat. No. 7,528,971, to Harrington.

BRIEF SUMMARY

What is disclosed is a novel system and method for determining a locus of colorant formulations that produce a desired color on a four colorant marking device. The method converts a set of L*a*b* values to lists of CMYK values in which all CMYK colorant formulations that produce each L*a*b* value are found and enumerated. The CMYK colorant formulations are found through a search starting with the lightest L*a*b* values then visiting neighboring L*a*b* values until the entire L*a*b* color set has been processed. The CMYK to LAB transform is represented as a multidimensional lookup table using pentahedral interpolation, which is the 4 dimensional analog of tetrahedral interpolation. For each L*a*b* value, an enclosing pentahedron is found and the CMYK values at the points where the iso-color locus for this L*a*b* value penetrates the surfaces of the pentahedron are recorded. Adjacent pentahedrons are then visited and this process continues until the gamut boundary is reached. All the CMYK colorant formulations for a given set of L*a*b* values are found and a particular CMYK colorant formulation is selected for each LAB which minimizes a cost function. Moreover, incorporating additional terms into the cost function can be applied with little difficulty, if desired. The present method is fast and efficient and provides a flexible and powerful approach for solving color many diverse management problems.

In one example embodiment, the present method for determining a locus of colorant formulations that produce a desired color on a four colorant marking device involves the following. A LUT comprising a plurality of sub-cubes arrayed on a structured grid in the four dimensional colorant space of a color device is received. Each vertex of each sub-cube is associated with a colorant formulation and the corresponding output color of the color device. The sub-cubes are tessellated into a plurality of pentahedrons with each face of each pentahedron pointing to the corresponding adjacent pentahedron. The relationship between colorant formulation and color in each pentahedron is then approximated by a linear function. A pentahedron that encompasses the desired color is identified. This is done using a directed search that starts from a seed pentahedron. If the seed pentahedron does not encompass the desired color, adjacent pentahedrons with L*a*b* values at the vertices that are closer to the desired color are tested. Any examined pentahedron that does not contain the desired color is marked so it will not be examined again. When a pentahedron which does contain the desired color is found, the colorant formulation values at the two locations where the locus penetrates the faces of the pentahedron are identified. The following steps are then iteratively repeated until the entire locus for the desired color has been found. Continue the locus into pentahedrons which are adjacent to the faces of the pentahedron penetrated by the locus and determine colorant formulation values at each location where the locus penetrates the faces of each adjacent pentahedron. Adjacent pentahedrons are visited and this process continues until the gamut boundary is reached. Once the process has completed, each of the colorant formulation values at each location are used to generate a piecewise linear representation of the locus containing all values that will produce the desired color. One of the pentahedrons on the locus is now used to seed the search for a pentahedron that contains nearby L*a*b* values. Iso-color loci are then found for these L*a*b* values. This process is iterated until iso-color loci are found for all L*a*b* values.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is novel system and method for determining a locus of colorant formulations that produce a desired color on a four colorant marking device.

Non-Limiting Definitions

A "Look-up Table" (LUT) is a multi-dimensional table used to map colorant combinations to the color space of a target device. The CMYK to LAB transform is represented as a multidimensional LUT using pentahedral interpolation, which is the 4 dimensional analog of tetrahedral interpolation. As used herein, a LUT comprises a plurality of sub-hypercubes (or sub-cubes) arrayed on a structured grid in a four dimensional colorant space of a color marking device. Each vertex of each sub-cube of the structured grid is associated with a colorant formulation and a corresponding output color.

A "colorant formulation" describes a combination of colorants which produce a corresponding output color when rendered on a given color marking device.

A "tetrahedron" is a polygon having four vertices with each face being formed by connecting three of the vertices to form a triangle. There are therefore four faces of a tetrahedron. If one had a locus in the three dimensional space of the tetrahedron, for example, CMY, and one knew that at least one CMY point was inside the tetrahedron, the locus must pierce the faces of the tetrahedron at two points. The three points of each triangle define a plane. As such, one can therefore find where the locus pierces the planes defined by the four triangular faces. Two of these points will lie inside the corresponding triangles. These are the points where the locus pierces the faces of the tetrahedron.

A "pentahedron" has five vertices. Each of its faces is formed by connecting four of these vertices to form a tetrahedron. Thus, a pentahedron has five tetrahedral faces. A locus in the four dimensional space of the pentahedron must pierce its tetrahedral surfaces at two points if any point on the locus lies inside the pentahedron. Each tetrahedron defines a three dimensional manifold in a four dimensional space, which can be thought of as a sort of plane, since a normal plane is a two dimensional manifold in a three dimensional space. By finding the point that satisfies the equations for the locus and this plane, the point where the locus pierces the plane can be determined. Two of these points will lie inside the corresponding tetrahedrons. These are the points where the locus pierces the faces of the pentahedron. One example pentahedron is shown at 100 in FIG. 1. At 102, is shown the two dimensional projection of one of the pentahedron's three dimensional tetrahedral faces. The point that is not part of the tetrahedron is off in the fourth dimension.

"Tessellation of a surface" (or tiling) is a technique for covering a surface with a pattern of flat patterns (or surfaces) so that there are no overlaps and no gaps. A regular tessellation is a pattern made by repeating a regular polygon.

"Tessellation of a space" is a natural extension of the surface tessellation technique to spaces of higher dimension. Such a technique fills the spaces with polyhedrons so that there are no overlaps and no gaps.

General Discussion

An important aspect of color management is the construction of device profiles which, in turn, involves deriving transformations between device dependent colorant spaces (e.g. CMYK) and device independent color spaces (e.g. CIELAB). For printers, the process begins with a characterization that derives a transformation from colorants to colors. In the main image path, this transform is inverted to generate a mapping from image colors to colorants. In the case where four or more colorants are used, the inverse is a one-to-many mapping with multiple colorants producing the same color. The problem at hand is to be able to quickly determine a set of colorant combinations that produces a desired color. This set of colorant combinations is termed the 'iso-color locus' or simply 'locus'. Once the locus has been determined, one colorant combination can be selected from the set of colorant combinations that meets a variety of constraints such as, for example, stability, ink limit, smoothness, etc. Such constraints may be defined by a cost function. The focus hereof is on the first part, namely, determining the locus of colorant formulations that produce a desired color.

What is next provided is a brief summary explanation of these methods. First, we represent the response of the engine by a CMYK to LAB LUT comprising a multi-dimensional grid. Within each sub-cube of the grid, we interpolate using pentahedral interpolation which is the 4 dimensional analog of tetrahedral interpolation in 3 dimensions. Each sub-cube is then divided into a plurality of pentahedrons, e.g., 24. In each pentahedron, there is a linear relationship between CMYK and LAB such that: LAB=M*CMYK+LAB0, where M is a CMYK to LAB matrix and LAB0 is an offset vector. The matrix and offset vector are determined by fitting the linear equations to the LAB values at the five vertices of the pentahedron. This results in 15 equations (equation for $L^*$, $a^*$, and $b^*$ for five points) with 15 unknowns (12 from the M matrix and 3 from the LAB0 vector). This is a well determined problem. The matrices and offset vector are different for each pentahedron but the function is continuous across the boundary between two pentahedrons (the common face) by construction. For each pentahedron, a bounding box (maximum and minimum values of $L^*$, $a^*$, and $b^*$) is constructed. If the desired LAB is within that bounding box, it may be within the pentahedron. To determine whether the desired LAB is within the pentahedron, we try to find CMYK for the desired LAB using the linear equation that describes the relationship between CMYK and LAB for that pentahedron. Since we have three equations (for the known $L^*$, $a^*$ and $b^*$) and four unknowns (C, M, Y, K), the solution is not a point, but a line. The line is our locus. If the line penetrates two of the faces of the pentahedron, the desired color point lies inside the pentahedron.

Continuity Proof

Any face that lies between two adjacent pentahedrons contains the 4 common vertices of the two pentahedrons. The CMYK coordinate system can be rotated so one coordinate is constant and equal to zero in this face, in which case we have: LAB=M1*ABC+LAB01 for one pentahedron, and: LAB=M2*ABC+LAB02 for the second pentahedron. Fitting this to the ABC and LAB values at the four common vertices produces 12 equations with 12 unknowns. Since all the constants in the equations are the same for both pentahedrons, M1=M2 and LAB01=LAB02, the LAB values for the two pentahedrons must be the same everywhere within the common face, and the function is continuous across the boundary.

Flow Diagram of One Embodiment

Figure 3:
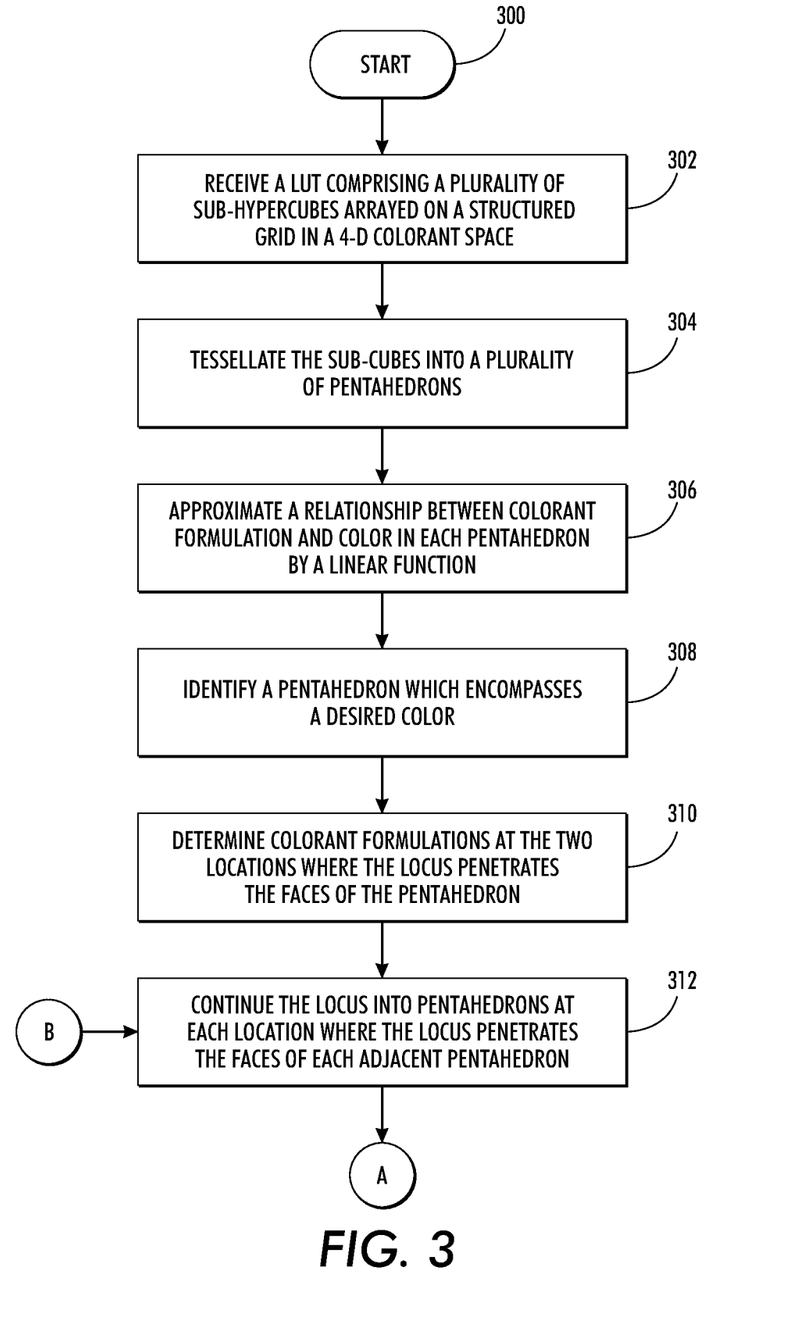
FIG. 3 illustrates a flow diagram of one example embodiment of the present method for determining a locus of colorant formulations that produce a desired color on a four colorant marking device.

Reference is now being made to the flow diagram of FIG. 3 which illustrates one example embodiment of the present method. Processing starts at 300 and immediately proceeds to step 302.

At step 302, receive a LUT comprising a plurality of sub-cubes arrayed on a structured grid in the four dimensional colorant space of a color device. This can be a printer model in the form of a CMYK to LAB LUT, for example. Each vertex of each sub-cube is associated with a colorant formulation and a corresponding output color.

Figure 1:
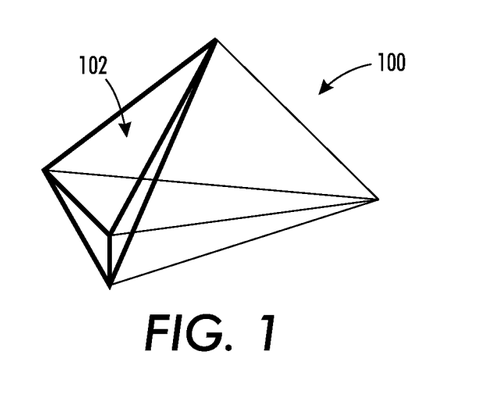
FIG. 1 illustrates a two dimensional projection of a four dimensional pentahedron.
Figure 2:
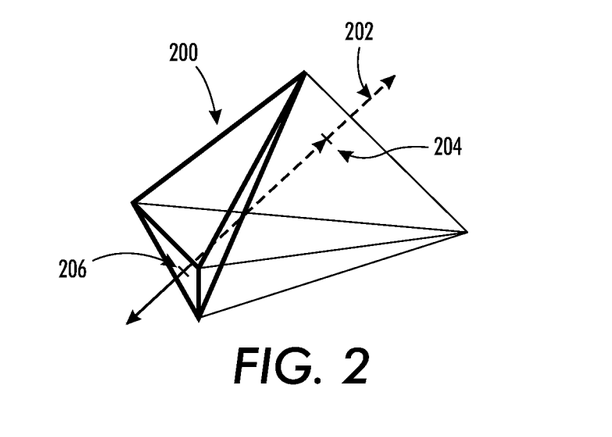
FIG. 2 illustrates the pentahedron of FIG. 1 having a locus penetrating the faces of the pentahedron at two locations.

At step 304, the sub-cubes are tessellated into a plurality of pentahedrons. One example pentahedron is shown in FIGS. 1 and 2. The four dimensional sub-cubes are split into penta-hedra by a natural extension of the scheme used for the tetrahedra. A pentahedron is defined by the vertices traversed as we go from lower to upper vertex. A total number of pentahedra in the sub-cube is 24.

At step 306, a relationship between colorant formulation and color in each pentahedron is approximated by a linear function. This entails finding a linear relationship between CMYK and LAB within each pentahedron. This relationship is of the form: LAB=M*CMYK+LAB0. The 3×4 matrix M, and the 3 vector LAB0, are adjusted so that the equation is consistent with the LAB and CMYK values at the five vertices of the pentahedron.

At step 308, identify a first pentahedron that encompasses a desired color. This is done using a directed search that starts from a seed pentahedron. If the seed pentahedron does not encompass the desired color, adjacent pentahedrons with L*a*b* values at the vertices that are closer to the desired color are tested. Any examined pentahedron that does not contain the desired color is marked so it will not be examined again. This processes can be performed iteratively in a manner as is generally known in the computer science arts. If the pentahedron does not contain the desired LAB color, previously unlisted adjacent pentahedrons which are closer to the desired color are added to a list. The procedure is then applied to the next pentahedron on the list. This is iterated until either a suitable pentahedron is found, or you hit the end of the list. In that case, you have not found the color in any reasonable pentahedron, so the color is out-of-gamut.

At step 310, colorant formulations at the two locations where the locus penetrates the faces of the pentahedron are determined. The equation for the locus can be written L=A*t+B, where L is a CMYK value on the locus, A and B are 4 dimensional vectors, and t is the only unknown variable. The equation for the three dimensional manifold in four space (the hyper-plane) that contains a tetrahedral face of the pentahedron is $T=f_i*D_i+P_n$ where T is a CMYK value in the hyper-plane, $P_n$ is the location of one of the vertices of the tetrahedral face in CMYK space, $f_i$ are three variables (i=1,2,3), and $D_i=P_i-P_n$, where $P_i$ is the location of the three other vertices of the tetrahedral face in CMYK space. Finding a CMYK value that satisfies the equations for both locus and hyper-plane gives us 4 equations (for C, M, Y, and K) and four unknowns (t, $f_1$, $f_2$, and $f_3$) which has a unique solution. Furthermore, it is easy to show that if $f_1$, $f_2$, and $f_3$ are all positive, and $f_1+f_2+f_3<1$, the point is within the tetrahedron. Using these relationships we can find whether or not the locus penetrates the tetrahedral faces of the pentahedron.

At step 312, the locus is continued into pentahedrons which are adjacent to the faces of the pentahedron penetrated by the locus. As shown in FIG. 2, locus 202 penetrates two faces of pentahedron 200 at locations 204 and 206.

Figure 4:
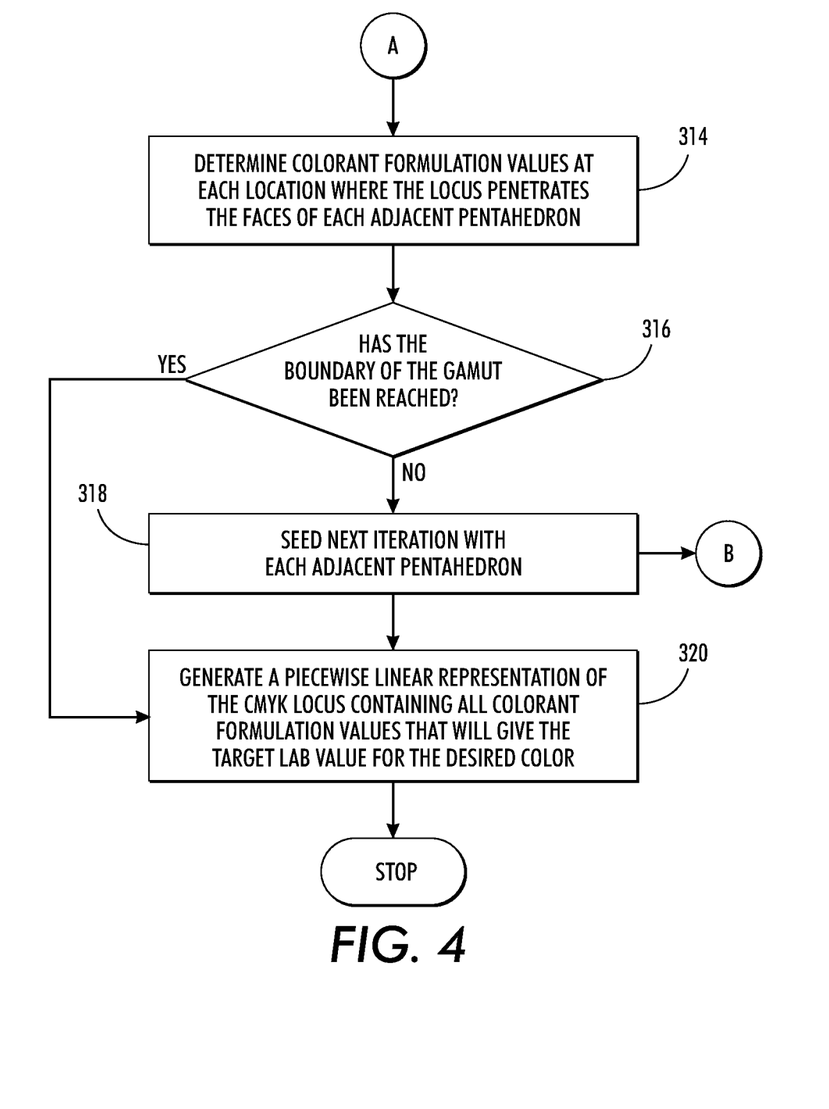
FIG. 4 is a continuation of the flow diagram of FIG. 3 with flow processing continuing with respect to node A.

Reference is now being made to the flow diagram of FIG. 4, which is a continuation of the flow diagram of FIG. 3 with flow processing continuing with respect to node A.

At step 314, colorant formulation values are determined at each of the two locations where the locus penetrates the faces of each adjacent pentahedron.

At step 316, a determination is made whether the boundary of the gamut has been reached. If so, then the entire locus for the desired color has been determined and further processing proceeds with respect to 320. Otherwise, processing proceeds with respect to step 318.

At step 318, the next iteration is seeded with adjacent pentahedrons. Processing repeats with respect to node B wherein the locus of the current iteration is continued into the "seeded" pentahedrons which are adjacent to the faces of the pentahedron penetrated by the locus. For each of these adjacent pentahedrons, colorant formulation values are determined at each location where that locus penetrates their respective faces. A determination is made again whether the boundary of the gamut has been reached. If the boundary of the gamut has not been reached, the next adjacent pentahedron is processed. As you go from pentahedron to adjacent pentahedron, segments keep being added to the ends of a continuous locus. If you hit a pentahedron that already contains the locus, the two ends of the locus meet, and you have a circular one. A circular locus must be tested and dealt with as a special case.

At step 320, once the process has completed, each of the colorant formulation values at each location are used to generate a piecewise linear representation of the locus containing all values that will produce the desired color. Thereafter, further processing stops. Alternatively, one of the pentahedrons on the locus can be used to seed a search for a pentahedron that contains nearby L*a*b* values and the iso-color loci can be found for these L*a*b* values. This alternative embodiment can be iterated until iso-color loci are found for all L*a*b* values. Once all the CMYK colorant formulations for a given set of L*a*b* values have been found, a particular CMYK colorant formulation is selected for each LAB which minimizes a cost function. Two embodiments of a cost function are discussed herein further.

CMYK to CMYK LUT

There are many applications where it is desired that one printer reproduce color just like another printer. For example, if the same CMYK values are sent to two printers, they must print exactly the same color, even though slightly different CMYK formulations may be required because of differences in printer characteristics. However it is desirable to keep the difference in CMYK formulation small so the two prints have similar characteristics (gloss, toner usage, etc.).

Call one printer a master printer and call another printer a slave printer. For a given CMYK input, drive the slave printer through a CMYK to CMYK LUT such that the slave printer gives exactly the same color as when this CMYK combination is printed using the master printer. To generate the CMYK to CMYK LUT, a grid of CMYK values is generated. These become the input CMYK values at the nodes of the LUT. These CMYK values are then mapped through a printer model of the master printer to produce target L*a*b* values. The target L*a*b* values are then mapped to the gamut of the slave printer. Next, a slave printer CMYK locus is found for each gamut mapped L*a*b* value using the teachings hereof. A value from the slave printer CMYK locus is chosen by applying a suitable constraint which minimizes a distance between slave and master CMYK formulation in a mean squares sense. This becomes the output CMYK for that node of the CMYK to CMYK LUT. Sometimes some CMY must be added to the K of the slave printer to make a color that the master printer generates with pure K. Since pure K is often used for text, this CMY splatter is more objectionable than the slight color error that would occur if the slave printer used pure K for these colors. Therefore, a pure K slave printer formulation is preferred for these nodes of the CMYK to CMYK LUT. The slave printer K value is chosen to give the same L* as the gamut mapped master printer.

LAB to CMYK Rendering LUT

Start off with a printer model in the form of a CMYK to LAB LUT. Each sub-cube of a LUT is divided into a plurality of cubes and each cube divided into a plurality of pentahedrons. Each pentahedron has pointers to adjacent pentahedrons having adjoining faces. A L*a*b* node object is made for each color desired to be processed. Generally, start with the lightest L*a*b* color since it is easy to find a pentahedron that contains a formulation for white. Then, find where the locus for this particular color penetrates the faces of the initial pentahedron. Continue the locus in the pentahedrons adjacent to these faces. The CMYK values where the locus penetrates the faces are recorded and stored in the LAB object. On subsequent iterations, adjacent LAB objects are seeded with a pentahedron from this locus and these LAB objects are added to a list to be processed. Then process the next LAB object on the list by first putting the seed pentahedron on a pentahedron search list. If it does not contain the desired LAB value, the adjacent unlisted pentahedra are added to this list. The one with an average LAB closest to the desired value is the next one to be checked, and the ones with LAB values further away are further down the list. The process of checking pentahedra on the list and adding adjacent unlisted ones is continued until a pentahedron containing the desired LAB value is found. This approach directs the search towards the correct region of CMYK space but allows the system to double back and check the less likely candidates if the search wanders into a blind alley. Once a pentahedron containing the desired LAB value is found, the locus of CMYK formulations is found and stored in the LAB object using the previously described technique. The next LAB object on the LAB list is processed. Any unlisted adjacent LAB objects are also added to the LAB list. This process is continued until there are no more LAB objects left to process.

In this application, there is a LAB object at each input node of the rendering LUT. Because of the node structure, LAB object adjacency is easy to determine. Once again we find an optimal CMYK output formulation from the CMYK locus for each of the nodes of the LUT by solving a constrained optimization problem wherein the objective is to minimize a cost function by adjusting the CMYK output formulation. The cost function is the weighted sum of C, M, Y and K errors (deviation from target C, M, Y and K values) and LAB error (deviation from target LAB values). The weights for C, M, Y and K errors and LAB errors, and the target C, M, Y and K values are set based upon some requirements or geometric position inside of a print gamut. The optimal CMYK formulation is the one that minimizes the cost function. One embodiment of a cost function comprises:

$$Cost = w_c(C-C_{target})^2 + w_m(M-M_{target})^2 + w_y(Y-Y_{target})^2 + w_k(K-K_{target})^2 + w_{lab}\Delta E(LAB, LAB_{target})$$

where $w_c$, $w_m$, $w_y$, and $w_k$ represent a weighting applied to a difference between each CMYK and each target CMYK, respectively, and $w_{lab}$ is a weighting applied to a $\Delta E$ difference. In another embodiment, the cost function comprises a weighted summation over a variety of constraints such as, for example, stability, ink limit, smoothness, etc.

One requirement is to minimize graininess by specifying a region where no K toner is to be used. This region generally contains the lighter colors, e.g., sky or skin tones. This requirement can be achieved by setting the K target value to zero and a relatively high K weight. The weight for the LAB error should also be set. If the no K region includes colors where in fact K must be used to make the color, the system can trade use of K against color or LAB error in a controlled fashion. We must also choose CMYK formulations for the regions where K must be used. Along the neutral axis, this is done by using a GCR. This GCR is a CMY to CMYK function specified by the user. The system runs a C=M=Y input sweep through the GCR, then puts the resulting CMYK sweep through the printer model to find the corresponding L* values. This gives a relationship between target CMYK values and L* along the neutral axis. The CMYK functions along the neutral axis and in the no K region must join smoothly. Therefore the CMY weights go to zero at the boundary of the no K region, and smoothly increase for darker colors, while the K weight is set to a relative high value. Once again the CMYK formulation is chosen to minimize the previously described cost function. Of course the no K region specification must be consistent with the GCR. In a preferred embodiment, the GCR is used to set the low L* limit of the no K region.

The two previously discussed regions are called the core regions, because the CMYK values for the remaining nodes of the rendering LUT are chosen using a region growing approach that grows outwards from this core. To initialize this growth, adjacent unlisted LAB nodes were being added to a list as the core nodes were being processed. When all of the core nodes had been processed, the system works on the unprocessed nodes on this list. Once again it chooses a CMYK from a locus by minimizing a cost function to which one additional term had been added. This additional term is called the CND term (for Cooperative Neighbor Determination). It is the CND weight multiplied by the mean square difference between a CMYK value on the locus and the average value of the CMYK values for the previously processed nodes in the vicinity. As each additional node is processed, any adjacent unlisted nodes are added to the end of the list. The processed region therefore grows in a compact manner until all the nodes have all been done. Preferably, the average CMYK value for the previously processed nodes in the vicinity is calculated by weighing the CMYK values by a function of the distance between the LAB of these nodes and the LAB of the one being processed. The closer nodes are weighted more heavily. The previously discussed C, M, Y, and K weights are generally set to zero for this part of the calculation.

The resulting relationship between LAB and CMYK is smooth over most of the in gamut of the LAB to CMYK rendering LUT. However difficulties can arise at the gamut surface. In the most common implementation, the requested LAB values for the out of gamut nodes of the LAB to CMYK rendering LUT have been mapped to the gamut surface, so there is only one CMYK solution for these requested LAB values. Often the range of possible CMYK solution rapidly narrows as we approach the gamut surface, and can be quite different from the CMYK formulations found by the region growing technique far from the gamut surface. Therefore, the CMYK formulations can change rapidly as we approach the gamut surface. High curvature in the LAB to CMYK function can produce large interpolation errors. To avoid this problem we smooth the LAB to CMYK function. The CMYK values produced by smoothing, however, may not give the desired LAB values. We therefore pick the CMYK value from the locus which is closest to the smoothed CMYK value. That is to say, the smoothed CMYK value is set as the new target value. This gives a result which is smoother, but is still accurate. This process can be iterated as many times as is necessary.

One problem still remains, however. Consider a case where the gamut surface is midway between two nodes of the LAB to CMYK rendering LUT. The out of gamut node has been mapped to the surface of the gamut, and we have found a CMYK value that gives this color. However, if we were to feed the color at the surface of the gamut into the rendering LUT, it would lie halfway between the in gamut and out of gamut node. Therefore the interpolated CMYK value would lie halfway between a CMYK that gives a color well within the gamut, and a CMYK that gives a color at the surface of the gamut. This interpolated CMYK would therefore give a color that was much less saturated than the one desired. To solve this problem we set the CMYK values for the out of gamut nodes so they give the correct CMYK values at the gamut surface. This means that they must be outside the range 0-255. They eventually will be clipped to this range, however interpolating between unclipped node values and then clipping gives saturated colors at the surface of the gamut, while interpolating between clipped node values gives undesirably de-saturated ones.

Those skilled in the art will appreciate that the teachings hereof may be practiced in a variety of system configurations, including multi-processor systems, microprocessor-based or programmable devices, networked PCs, minicomputers, mainframe computers, hand-held devices, and the like. Certain aspects of such a system would operate in accordance with pre-programmed instructions to carry out the methods disclosed herein. Such a system might include a commercially available graphics rendering capability that can also be associated with a networked storage medium or similar memory devices accessible via an Internet or intranet. It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Generally, various modules include routines, objects, components, etc., that perform particular tasks. Data structures may likely be employed to implement particular abstract data types as are well known in the programming arts to store variables and data used in various of the computations described herein. Such a system may be incorporated, in whole or in part, within an image output device or may be a separate system altogether such as, for instance, ASIC, DFE, or a standalone API. An image processing system would include a processor capable of reading machine-executable instructions stored in an addressable memory (or processor cache) or local storage device and executing those instructions to perform various aspects of the present gamut mapping method. Other embodiments include a special purpose computer designed to perform the methods disclosed herein.

Figure 5:
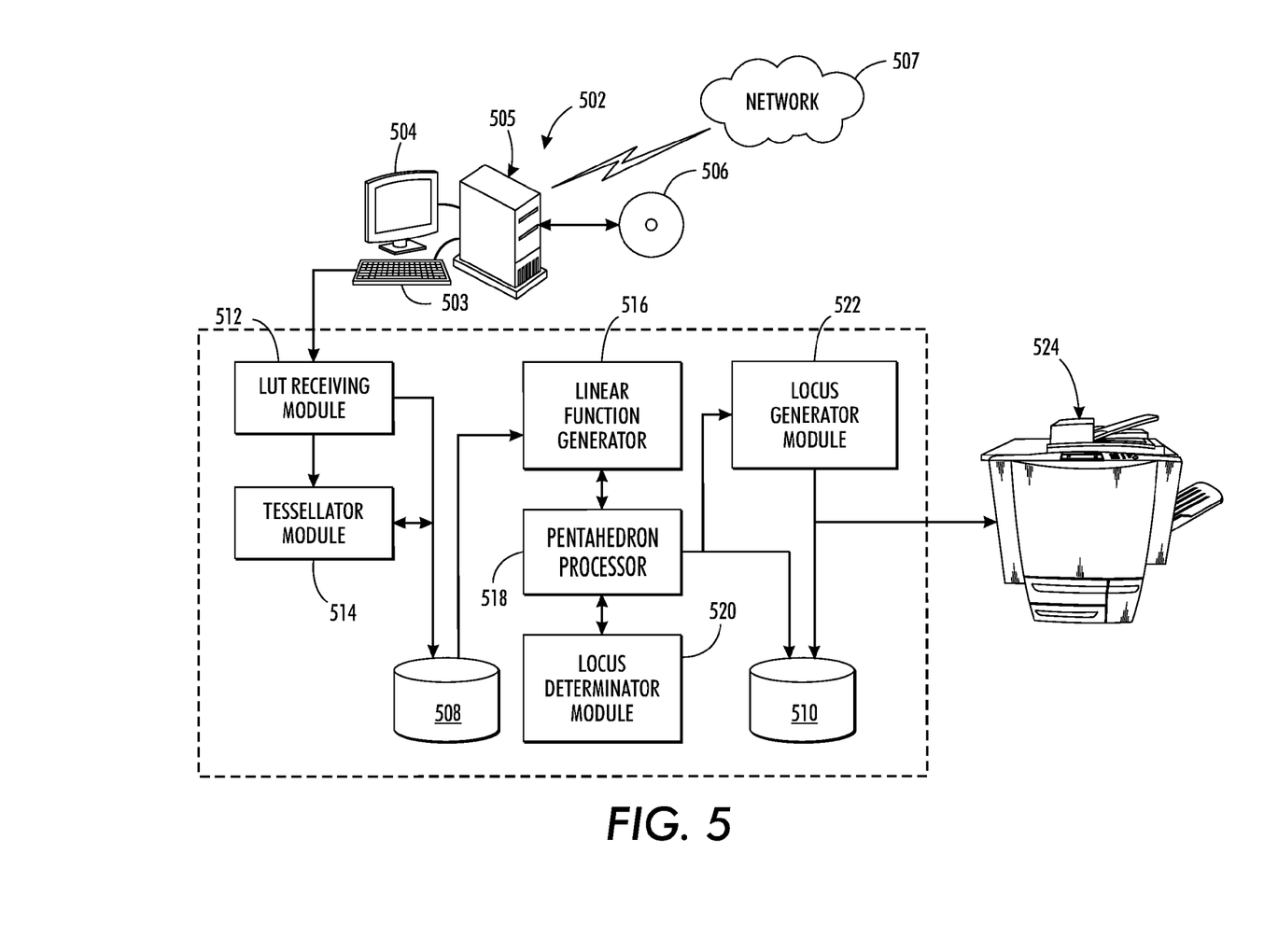
FIG. 5 is a block diagram of an example image processing system which receives a LUT and wherein various aspects of the present method for determining a locus of colorant formulations are performed as described with respect to the flow diagrams of FIGS. 3 and 4.

Reference is now being made to FIG. 5 which is a block diagram of an example system wherein various aspects of the present method for determining a locus of colorant formulations that produce a desired color on a four colorant marking device are performed, as described with respect to the flow diagrams of FIGS. 3 and 4.

The illustrated system of FIG. 5 generally comprises a computer workstation 502 which includes a keyboard 503, monitor 504, case 505 housing a motherboard, processor, hard drive, CD-ROM drive, and a network interface card (not shown), and rewriteable media 506 for storing executable machine readable program instructions and data. Computer workstation 502 is in communication with one or more devices over network 507, including storage devices 508 and 510, which may be the same device or memory. Any of the storage devices may comprise memory, cache memory, ROM/RAM, a database system, or a remote device accessible over network 507. LUT Receiving Module 512 receives a plurality of sub-cubes arrayed on a structured grid in the four dimensional colorant space of a color device. Each vertex of each sub-cube is associated with a colorant formulation and a corresponding output color. LUT Receiving Module 512 may receive the plurality of sub-cubes from the workstation 502 or, alternatively, from a remote device over network 507. Module 512 may further arrange the received sub-cubes onto a structured grid and store these on storage device 508. LUT Receiving Module 512 provides the arrayed sub-cubes to Tessellator Module 514 which tessellates the received sub-cubes into a plurality of pentahedrons. Each face of each pentahedron points to a corresponding adjacent pentahedron. The tessellated sub-cubes are stored to storage device 508. Linear Function Generator 516 approximates a relationship between colorant formulation and color in each pentahedron by a linear function. Pentahedron Processor 518 identifies a first pentahedron that encompasses the desired color and determines colorant formulations at the two locations where the locus penetrates the faces of the pentahedron. Pentahedron Processor 518 continues the locus into pentahedrons which are adjacent to the faces of the pentahedron penetrated by the locus. Pentahedron Processor further determines colorant formulations values at each location where the locus penetrates the faces of each adjacent pentahedron. Each following iteration is recursively seeded with adjacent pentahedrons. Such iterations may be performed recursively. Locus Determinator Module 520 checks to whether the entire locus for the desired color has been found. Once the process has completed for the desired color, Locus Generator Module 522 generates a piecewise linear representation of the CMYK locus containing all values that give the target L*a*b* value for the desired color. This piecewise linear representation may be stored in storage device 510. A CMYK value can be substituted for any point along the locus into a device forward model to generate LAB values corresponding to the initial color. The process can be repeated for each of a desired number of selected colors which will produce the desired color on image output device 524.

Image output device 524 incorporates a user interface comprising a display and keypad for entering or selecting values. The user interface may further be used to set parameters and control image processing operations. The instructions for these various operations may be input via a touch screen display. Such a system would further include various device controllers and other special purpose computer processors capable of executing machine executable program instructions. Such a device would include one or more network connections for receiving and/or transmitting data over a network via a wire, cable, modem, or wireless device, and may further incorporate a CD-ROM or other storage device wherein a removable media can be inserted and data deposited thereon.

It should be appreciated that any of the modules and processing units shown and described with respect to the block diagram of FIG. 5 are in communication with computer workstation 502, and some or all of the functionality described for any of these modules may be performed, in whole or in part, within workstation 502 or by a special purpose computer system. It should be appreciated that various modules may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules include both physical and logical connections. Modules may further include one or more software/hardware modules which may further comprise an operating system, drivers, device controllers, and other apparatuses some or all of which may be connected via a network.

It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Example Special Purpose Computer System

Figure 6:
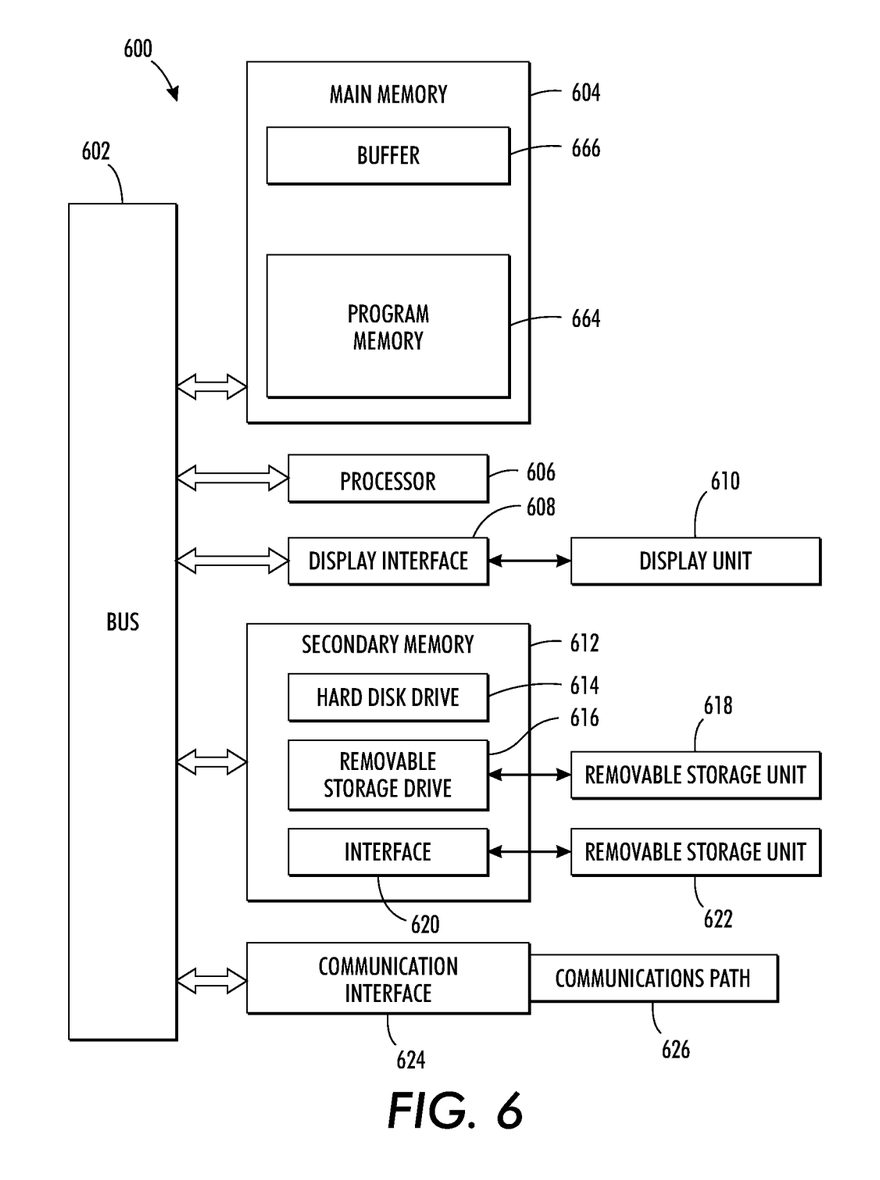
FIG. 6 illustrates a block diagram of one example embodiment of a special purpose computer system for implementing one or more aspects of the present system and method and described with respect to the flow diagrams of FIGS. 3 and 4 and the block diagram of FIG. 5.

Reference is now being made to FIG. 6 which illustrates a block diagram of one example embodiment of a special purpose computer system for implementing one or more aspects of the present method as described with respect to the embodiments of the flow diagrams of FIGS. 3 and 4 and the block diagram of FIG. 5. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 600 includes processor 606 for executing machine executable program instructions for carrying out all or some of the present method. The processor is in communication with bus 602. The system includes main memory 604 for storing machine readable instructions. Main memory may comprise random access memory (RAM) to support reprogramming and flexible data storage. Buffer 666 stores data addressable by the processor. Program memory 664 stores machine readable instructions for performing the present method. A display interface 608 forwards data from bus 602 to display 610. Secondary memory 612 includes a hard disk 614 and storage device 616 capable of reading/writing to removable storage unit 618, such as a floppy disk, magnetic tape, optical disk, etc. Secondary memory 612 may further include other mechanisms for allowing programs and/or machine executable instructions to be loaded onto the processor. Such mechanisms may include, for example, a storage unit 622 adapted to exchange data through interface 620 which enables the transfer of software and data. The system includes a communications interface 624 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 626 which carries such signals and may be implemented using wire, cable, fiber optic, phone line, cellular link, RF, memory, or other means known in the arts.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system. The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entity.

What is claimed is:

1. A method for determining a locus of colorant formulations that produce a desired color on a four colorant marking device, the method comprising:
    retrieving a LUT comprising a plurality of sub-cubes arrayed on a structured grid in a four dimensional colorant space of a color marking device, each vertex of each sub-cube being associated with a colorant formulation and a corresponding output color of said color marking device;
    tesselating said sub-cubes into a plurality of pentahedrons;
    approximating a relationship between colorant formulation and color in each pentahedron by a linear function;
    identifying a pentahedron that encompasses a desired color;
    determining colorant formulation values at two locations where a locus penetrates the faces of said identified pentahedron; and
    repeating until a boundary of a gamut of said color marking device has been reached:
        continuing said locus into pentahedrons which are adjacent to the faces of the pentahedron penetrated by said locus;
        determining colorant formulation values at two locations where said locus penetrates said faces of each adjacent pentahedron; and
        seeding a next iteration with each of said adjacent pentahedrons.

2. The method of claim 1, wherein identifying said pentahedron that encompasses said desired color comprises selecting a starting pentahedron, and in response to said starting pentahedron not containing said desired color performing a directed search comprising:
    testing adjacent pentahedrons with color values at the vertices closer to said desired color;
    marking any examined pentahedron that does not contain said desired color so it will not be examined again; and
    repeating until a pentahedron encompassing said desired color has been identified.

3. The method of claim 1, further comprising using each of said colorant formulation values at each location to generate a piecewise linear representation of said locus which contains all values that will produce said desired color.

4. The method of claim 1, further comprising:
    using one of said pentahedrons on said locus to seed a search for a pentahedron that contains nearby color values;
    finding a locus for said nearby color values; and
    repeating until a locus is found for all color values.

5. The method of claim 1, further comprising substituting a colorant formulation value for any point along said locus into a device forward model to generate color values corresponding to said desired color.

6. The method of claim 1, wherein, once colorant formulation values for a given set of color values have been determined, further comprising selecting a particular colorant formulation value for each color which minimizes a cost function.

7. The method of claim 6, wherein said cost function comprises a weighted summation over any of: stability, ink limit, and smoothness.

8. The method of claim 1, wherein said color is described in terms of L*a*b* coordinates and said colorants are described in terms of CMYK coordinates.

9. The method of claim 1, wherein approximating said relationship between colorant formulation and color in each pentahedron comprises finding a linear relationship between each CMYK and LAB values within each pentahedron, said linear relationship having a form:

$$LAB = M*CMYK + LAB0,$$

where the 3×4 matrix M and the 3 vector LAB0 are adjusted such that the equation is consistent with the LAB and CMYK values at the five vertices of said pentahedron.

10. A system for determining a locus of colorant formulations that produce a desired color on a four colorant marking device, said system comprising:
    a memory and a storage device; and
    a processor in communication with said memory and storage device, said processor executing machine readable instructions for performing the method of:
        retrieving a LUT comprising a plurality of sub-cubes arrayed on a structured grid in a four dimensional colorant space of a color marking device, each vertex of each sub-cube being associated with a colorant formulation and a corresponding output color of said color marking device;
        tesselating said sub-cubes into a plurality of pentahedrons;
        approximating a relationship between colorant formulation and color in each pentahedron by a linear function;
        identifying a pentahedron that encompasses a desired color;
        determining colorant formulation values at two locations where a locus penetrates the faces of said identified pentahedron; and
        repeating until a boundary of a gamut of said color marking device has been reached:
            continuing said locus into pentahedrons which are adjacent to the faces of the pentahedron penetrated by said locus;
            determining colorant formulation values at two locations where said locus penetrates said faces of each adjacent pentahedron; and
            seeding a next iteration with each of said adjacent pentahedrons.

11. The system of claim 10, wherein identifying said pentahedron that encompasses said desired color comprises selecting a starting pentahedron, and in response to said starting pentahedron not containing said desired color performing a directed search comprising:
    testing adjacent pentahedrons with color values at the vertices closer to said desired color;
    marking any examined pentahedron that does not contain said desired color so it will not be examined again; and
    repeating until a pentahedron encompassing said desired color has been identified.

12. The system of claim 10, further comprising using each of said colorant formulation values at each location to generate a piecewise linear representation of said locus which contains all values that will produce said desired color.

13. The system of claim 10, further comprising:
using one of said pentahedrons on said locus to seed a search for a pentahedron that contains nearby color values;
finding a locus for said nearby color values; and
repeating until a locus is found for all color values.

14. The system of claim 10, further comprising substituting a colorant formulation value for any point along said locus into a device forward model to generate color values corresponding to said desired color.

15. The system of claim 10, wherein, once colorant formulation values for a given set of color values have been determined, further comprising selecting a particular colorant formulation for each color value which minimizes a cost function.

16. The system of claim 15, wherein said cost function comprises a weighted summation over any of: stability, ink limit, and smoothness.

17. The system of claim 10, wherein said color is described in terms of L*a*b* coordinates and said colorants are described in terms of CMYK coordinates.

18. The system of claim 10, wherein approximating said relationship between colorant formulation and color in each pentahedron comprises finding a linear relationship between each CMYK and LAB values within each pentahedron, said linear relationship having a form:

$$LAB = M*CMYK + LAB0,$$

where the 3×4 matrix M and the 3 vector LAB0 are adjusted such that the equation is consistent with the LAB and CMYK values at the five vertices of said pentahedron.

19. A computer implemented method for determining a locus of colorant formulations that produce a desired color on a four colorant marking device, the method comprising:
retrieving a LUT comprising a plurality of sub-cubes arrayed on a structured grid in a four dimensional colorant space of a color marking device, each vertex of each sub-cube being associated with a colorant formulation and a corresponding output color of said color marking device;
tesselating said sub-cubes into a plurality of pentahedrons;
approximating a relationship between colorant formulation and color in each pentahedron by a linear function;
selecting a starting pentahedron;
in response to said starting pentahedron not containing a desired color performing a directed search comprising:
testing adjacent pentahedrons with color values at the vertices closer to said desired color;
marking any examined pentahedron that does not contain said desired color so it will not be examined again; and
repeating until a pentahedron encompassing said desired color has been identified;
determining colorant formulation values at two locations where a locus penetrates the faces of said identified pentahedron;
repeating until a boundary of a gamut of said color marking device has been reached:
continuing said locus into pentahedrons which are adjacent to the faces of the pentahedron penetrated by said locus;
determining colorant formulation values at two locations where said locus penetrates said faces of each adjacent pentahedron; and
seeding a next iteration with each of said adjacent pentahedrons; and
using each of said colorant formulation values at each location to generate a piecewise linear representation of the locus containing all values that will produce said desired color.

20. The method of claim 19, further comprising:
using one of said pentahedrons on said locus to seed a search for a pentahedron that contains nearby color values;
finding a locus for said nearby color values; and
repeating until a locus is found for all color values.

21. The method of claim 19, further comprising substituting a CMYK value for any point along said locus into a device forward model to generate L*a*b* values corresponding to said desired color.

22. The method of claim 19, wherein, once said colorant formulations for a given set of color values have been determined, further comprising selecting a particular colorant formulation for each color which minimizes a cost function.

23. The method of claim 19, wherein said cost function comprises a weighted summation over any of: stability, ink limit, and smoothness.

24. The method of claim 19, wherein said color is described in terms of L*a*b* coordinates and said colorants are described in terms of CMYK coordinates.

25. The method of claim 19, wherein approximating said relationship between colorant formulation and color in each pentahedron comprises finding a linear relationship between each CMYK and LAB values within each pentahedron, said linear relationship having a form:

$$LAB = M*CMYK + LAB0,$$

where the 3×4 matrix M and the 3 vector LAB0 are adjusted such that the equation is consistent with the LAB and CMYK values at the five vertices of said pentahedron.

* * * * *